(12) United States Patent
Gao et al.

(10) Patent No.: US 9,276,730 B2
(45) Date of Patent: Mar. 1, 2016

(54) DYNAMIC UPLINK/DOWNLINK CONFIGURATION FOR TIME DIVISION DUPLEX

(71) Applicant: Broadcom Corporation, Irvine, CA (US)

(72) Inventors: Chunyan Gao, Beijing (CN); Erlin Zeng, Beijing (CN); Jing Han, Beijing (CN); Na Wei, Beijing (CN); Haiming Wang, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 102 days.

(21) Appl. No.: 13/972,302

(22) Filed: Aug. 21, 2013

(65) Prior Publication Data

US 2013/0336177 A1 Dec. 19, 2013

Related U.S. Application Data

(63) Continuation of application No. PCT/CN2011/071120, filed on Feb. 21, 2011.

(51) Int. Cl.
*H04W 4/00* (2009.01)
*H04L 5/14* (2006.01)
*H04W 72/04* (2009.01)
*H04L 1/16* (2006.01)

(52) U.S. Cl.
CPC ......... *H04L 5/1476* (2013.01); *H04W 72/0446* (2013.01); *H04L 1/1671* (2013.01)

(58) Field of Classification Search
USPC .......................... 370/280, 330, 331, 338, 329
See application file for complete search history.

(56) References Cited

U.S. PATENT DOCUMENTS

| 2009/0135748 | A1* | 5/2009 | Lindoff et al. | ................. 370/296 |
| 2010/0027446 | A1  | 2/2010 | Choi et al. | |
| 2010/0260156 | A1* | 10/2010 | Lee et al. | ....................... 370/336 |
| 2011/0007674 | A1* | 1/2011 | Dai et al. | ....................... 370/282 |

FOREIGN PATENT DOCUMENTS

| CN | 101754096 | 6/2010 |
| CN | 101784117 A | 7/2010 |

OTHER PUBLICATIONS

PCT International Search Report and Written Opinion mailed Nov. 24, 2011, both of which were issued in a related PCT Application No. PCT/CN2011/071120 (9 pages).

* cited by examiner

*Primary Examiner* — Zewdu A Beyen
(74) *Attorney, Agent, or Firm* — Foley & Lardner LLP; Christopher J. McKenna; Helen H. Zhang (57) ABSTRACT

A method and apparatus which allows dynamic TDD UL/DL configuration that is able to adapt to an instantaneous traffic situation. The values of at least one uplink/downlink configuration indication bit in a predetermined region in a received downlink time division duplex subframe of wireless data transmission are examined. A time division duplex uplink/downlink configuration for a predetermined configuration period is determined based on the examined values.

23 Claims, 4 Drawing Sheets

Prior Art

DYNAMIC UPLINK/DOWNLINK CONFIGURATION FOR TIME DIVISION DUPLEX

CROSS REFERENCE TO RELATED APPLICATION

This application is a Continuation of PCT International Patent Application No PCT/CN2011/071120 filed on Feb. 21, 2011, the entire content of which is incorporated herein by reference.

BACKGROUND INFORMATION

The invention relates generally to mobile communications. In particular, the invention relates to methods, computer programs, apparatuses and radio network nodes for dynamic uplink/downlink configuration for time division duplex.

Long Term Evolution (LTE) was introduced in release 8 of $3^{rd}$ Generation Partnership Project (3GPP) which is a specification for $3^{rd}$ generation mobile communication systems. LTE is a technique for mobile data transmission that aims to increase data transmission rates and decrease delays, among other things. LTE uses orthogonal frequency division multiple access (OFDMA) as its multiple access method in the downlink. The uplink uses single-carrier frequency division multiple access (SD-FDMA). 3GPP release introduced a next version of LTE, named LTE Advanced, fulfilling $4^{th}$ generation system requirements.

Both LTE and LTE Advanced may utilize a technique called time division duplex (TDD) for separating the transmission directions from the user to the base station and back. In TDD mode, the downlink and the uplink are on the same frequency and the separation occurs in the time domain, so that each direction in a call is assigned to specific timeslots.

Herein, the term "downlink" (DL) is used to refer to the link from the base station to the mobile device or user equipment, and the term "uplink" (UL) is used to refer to the link from the mobile device or user equipment to the base station.

Figure 4:
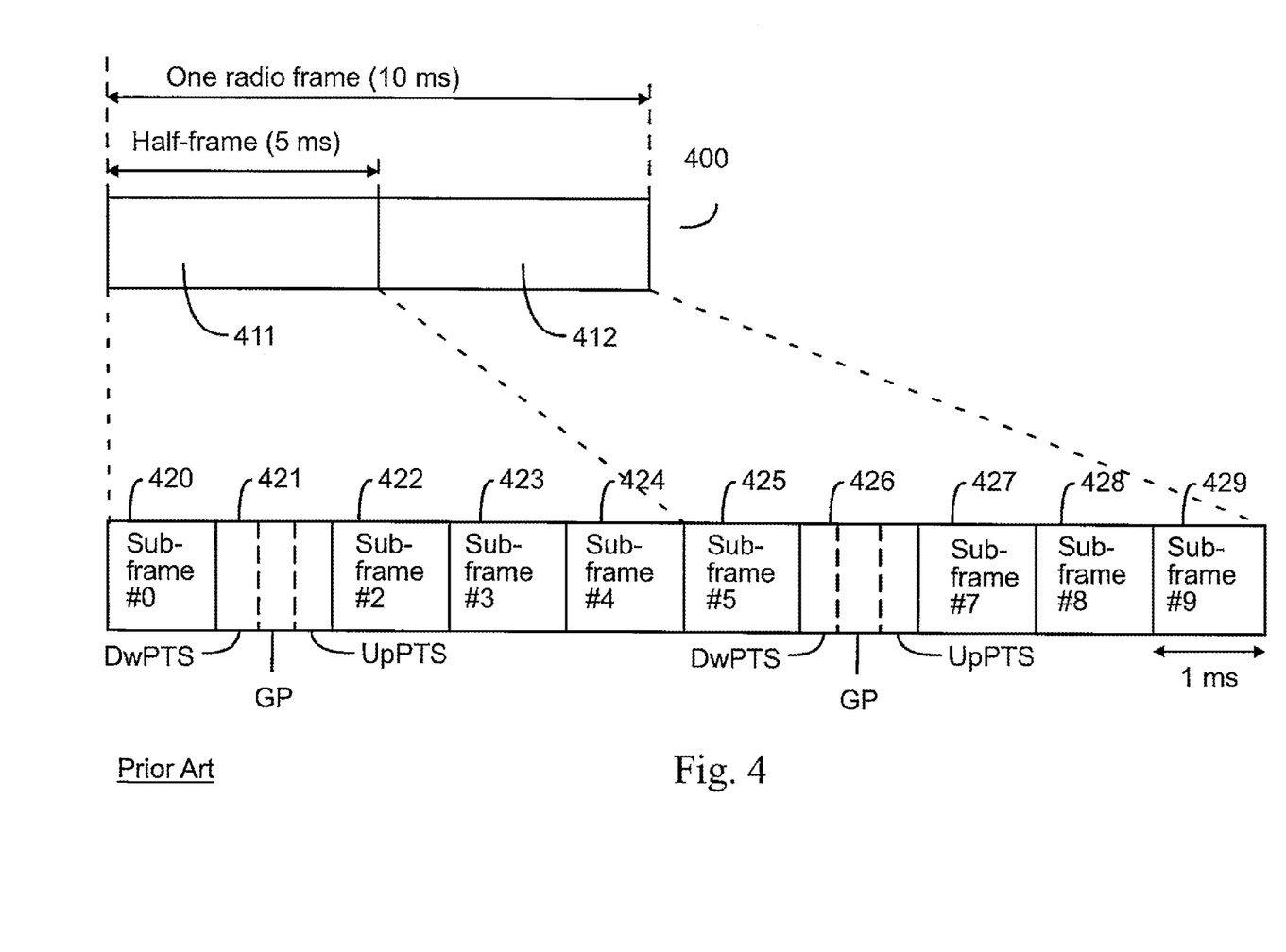
FIG. 4 is a diagram illustrating the frame structure for time division duplex.

FIG. 4 illustrates the frame structure for LTE TDD. The uplink and downlink for LTE TDD are divided into radio frames 400, each of which is 10 ms in length. The radio frame 400 consists of two half-frames 411, 412, both of which are 5 ms long. The first half-frame 411 is further split into five subframes 420-424, each 1 ms long. Similarly, the second half-frame 412 is further split into five subframes 425-429, each 1 ms long. Subframes 420, 422-425, and 427-429 are reserved for either downlink or uplink data, whereas subframes 421 and 426 are so called "special" subframes that include three special fields: downlink pilot time slot (DwPTS), guard period (GP) and uplink pilot time slot (UpPTS). However, as discussed below, in some configurations subframe 426 may also be reserved for downlink data, with the subframe 421 being the only special subframe. All non-special subframes consist of two time slots, both 0.5 ms long.

TDD allows asymmetry of the uplink and downlink data rates, i.e. as the amount of uplink or downlink data increases, more communication capacity can be allocated, and as the traffic load becomes lighter, capacity can be taken away.

This asymmetry is implemented via seven different semi-static uplink-downlink configurations, illustrated below in Table 1:

TABLE 1

| Uplink/downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, "D" indicates that downlink data is transmitted in this subframe, "U" indicates that uplink data is transmitted in this subframe, and "S" indicates that the special fields DwPTS, GP and UpPTS are transmitted in this subframe. As can be seen, the seven different uplink/downlink configurations 0-6 contain different ratios of uplink and downlink data, and allow asymmetric uplink and downlink data rates.

Furthermore, in all seven configurations 0-6 subframes 0 and 5 are always for downlink, subframe 1 is always a special subframe, subframe 2 is always for uplink, and subframe 6 is a special subframe or for downlink. In other words, no matter which uplink-downlink configuration is applied, there are always subframes with fixed link direction. Herein, such subframes with fixed link direction are referred to as fixed subframes. Subframes with non-fixed link direction are herein referred to as non-fixed subframes.

The above prior art uplink-downlink configurations can provide between 40% and 90% DL subframes. The current mechanism for changing from one uplink-downlink configuration to another is based on a system information exchange procedure. However, since system information is sent at the interval of at least 640 ms, it cannot provide dynamic TDD configuration to adapt to an instantaneous traffic situation, leading to inefficient resource utilization, especially in cells with a small number of users where the traffic situation changes more frequently.

Furthermore, in LTE TDD systems, many operations at both evolved Node B (eNB) and user equipment (UE) sides depend on the semi-static TDD configuration. These operations include e.g. radio resource management (RRM) measurements, channel quality information (CQI) measurements, channel estimations, physical downlink control channel (PDCCH) detections, and hybrid automatic repeat request (HARQ) timings.

The UE firstly needs to read the system information to find out the TDD UL/DL configuration in its current cell. Then it knows which subframe to monitor for measurement, for CQI measure and report, for time domain filtering to get channel estimation, for PDCCH detection, or for DL/UL ACK/NACK feedback. For example, in the ACK/NACK multiplexing scheme, the feedback values of b(0),b(1) and the ACK/NACK resource $n_{PUCCH}^{(1)}$ are generated by channel selection according to Tables 10.1-2, 10.1-3, and 10.1-4 in 3GPP TS 36.213 V9.0.1 specification (December 2009) for M=2, 3, and 4, respectively. Also, the UE needs firstly get the TDD UL/DL configuration so that it knows the correct table to use. Otherwise, there will be a detection error at the eNB side. After that, correct operation depends on the correct understanding of the signaling indicating the TDD UL/DL configuration.

Prior art also includes indicating the TDD UL/DL configuration implicitly via a scheduling grant. However, the problem with this is that if there is no scheduling grant for a given UE, the UE will never know the link direction of the non-fixed subframes. Therefore, it cannot use these subframes for RSM measurement, CQI measurement, or filtering for channel estimation. In practice, the CQI in the non-fixed subframes may be quite different from that in the fixed subframes, due to e.g. different interference levels. Thus, enabling UE's CQI measurement in non-fixed subframes may provide the network side relevant information for better resource scheduling. Moreover, the UE has to monitor the non-fixed subframes for PDCCH before knowing if it is DL or UL, and this increases the UE's power consumption. Yet another problem is on the HARQ timing: if there is no scheduling grant for a given non-fixed subframe, the UE will not be aware of the real TDD UL/DL configuration. Therefore, it cannot use the TDD UL/DL configuration dependent. HARQ timing as specified in Release 10. A solution could be to restrict the HARQ feedback to a fixed subframe, but this would lead to increased HARQ delay.

Therefore, an object of the present invention is to alleviate the problems described above and to introduce a solution that allows dynamic TDD UL/DL configuration that is able to adapt to an instantaneous traffic situation.

SUMMARY

A first aspect of the present invention is a method in which the values of at least one uplink/downlink configuration indication bit in a predetermined region in a received downlink time division duplex subframe of wireless data transmission are examined. A time division duplex uplink/downlink configuration for a predetermined configuration period is determined based on the examined values.

A second aspect of the present invention is an apparatus which includes an uplink/downlink configuration indication bit examination unit that is configured to examine the values of at least one uplink/downlink configuration indication bit in a predetermined region in a received downlink time division duplex subframe of wireless data transmission; and a time division duplex uplink/downlink configuration determination unit that is configured to determine a time division duplex uplink/downlink configuration for a predetermined configuration period based on the examined values.

A third aspect of the present invention is a computer program including code adapted to cause the following when executed on a data-processing system:

examining the values of at least one uplink/downlink configuration indication bit in a predetermined region in a received downlink time division duplex subframe of wireless data transmission; and determining a time division duplex uplink/downlink configuration for a predetermined configuration period based on the examined values.

The computer program of the third aspect may be stored on a computer readable medium.

A fourth aspect of the present invention is a radio network node which includes a timing obtainer that is configured to obtain timing for at least one time division duplex uplink/downlink configuration indication bit; a configuration period length determination unit that is configured to determine length of a configuration period for a time division duplex uplink/downlink configuration; a time division duplex uplink/downlink configuration indication bit generator that is configured to generate at least one time division duplex uplink/downlink configuration indication bit indicating a time division duplex uplink/downlink configuration for the configuration period of the determined length; and a transmitter that is configured to transmit an indication of the obtained timing of the at least one time division duplex uplink/downlink configuration indication bit, to transmit an indication of the determined length of the configuration period, and to transmit the generated at least one time division duplex uplink/downlink configuration indication bit in a region indicated by the obtained timing in a downlink time division duplex subframe of wireless data transmission.

A fifth aspect of the present invention is an apparatus which includes an uplink/downlink configuration indication bit examination means for examining the values of at least one uplink/downlink configuration indication bit in a predetermined region in a received downlink time division duplex subframe of wireless data transmission; and a time division duplex uplink/downlink configuration determination means for determining a time division duplex uplink/downlink configuration for a predetermined configuration period based on the examined values.

In an embodiment of the invention, the received subframe includes a fixed subframe.

In embodiment of the invention, the predetermined configuration period includes one of a current configuration period and a next configuration period.

In an embodiment of the invention, the determined time division duplex uplink/downlink configuration includes one of an uplink allocation and a downlink allocation for at least one non-fixed subframe in the predetermined configuration period.

In an embodiment of the invention, the timing of the at least one uplink/downlink configuration indication bit to be examined is obtained based on a received indication of the timing of the at least one uplink/downlink configuration indication bit.

In an embodiment of the invention, the predetermined region includes a physical control channel associated region in the received subframe.

In an embodiment of the invention, the physical control channel associated region includes a physical hybrid ARQ indicator channel associated region, and the at least one uplink/downlink configuration indication bit is included in at least one predetermined resource of the physical hybrid ARQ indicator channel, and the indication of the timing of the at least one uplink/downlink configuration indication bit includes an indication of the timing of the at least one predetermined resource.

In an embodiment of the invention, the physical control channel associated region includes a physical downlink control channel associated region, and the at least one uplink/downlink configuration indication bit is included in a predetermined control channel element of the physical downlink control channel, and the indication of the timing of the at least one uplink/downlink configuration indication bit includes an indication of an index of the predetermined control channel element.

In an embodiment of the invention, the length of the predetermined configuration period is obtained from a received indication of the length of the predetermined configuration period.

In an embodiment of the invention, a next time division duplex uplink/downlink configuration is determined based on received system information in response to a predetermined value of the received indication of the length of the predetermined configuration period.

It is to be understood that the aspects and embodiments of the invention described above may be used in any combination with each other. Several of the aspects and embodiments may be combined together to form a further embodiment of the invention. A method, an apparatus, or a computer program which is an aspect of the invention may include at least one of the embodiments of the invention described above.

The invention allows dynamic TDD UL/DL configuration that is able to adapt to an instantaneous traffic situation. Furthermore, since the link direction of each non-fixed subframe is known to the UE before detection of the non-fixed subframe, the UE can stop PDCCH detection in the non-fixed subframes set for UL and thereby reduce power consumption of the UE. Furthermore, indicating the TDD UL/DL configuration in advance simplifies UE's implementation of channel estimation filtering. Furthermore, by sending the signaling in a predetermined resource, blind detection is not increased at the UE side. Furthermore, by reusing physical control format indicator channel (PCFICH), physical hybrid ARQ indicator channel (PHICH), or a downlink control information (DCI) encoding scheme, the implementation complexity of the invention is low. Furthermore, by using physical channel (PHY) signaling the processing delay is reduced, and it enables the eNB to adjust the TDD UL/DL configuration efficiently to adapt to the traffic. Compared with higher layer signaling, the processing delay is reduced, and it does not require the eNB to predict the traffic situation. The configuration period and link performance of the invention can be controlled by the eNB. Furthermore, the invention enables the UEs to measure the CQI in the non-fixed subframes which helps the eNB scheduling. Furthermore, the invention can reduce the HARQ timing by explicitly indicating whether the non-fixed subframe is DL or UL in the beginning of a current configuration period or in the previous configuration period. Furthermore, the implementation of the invention is transparent to legacy UEs. Therefore it can be introduced to the network in a backward compatible way.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
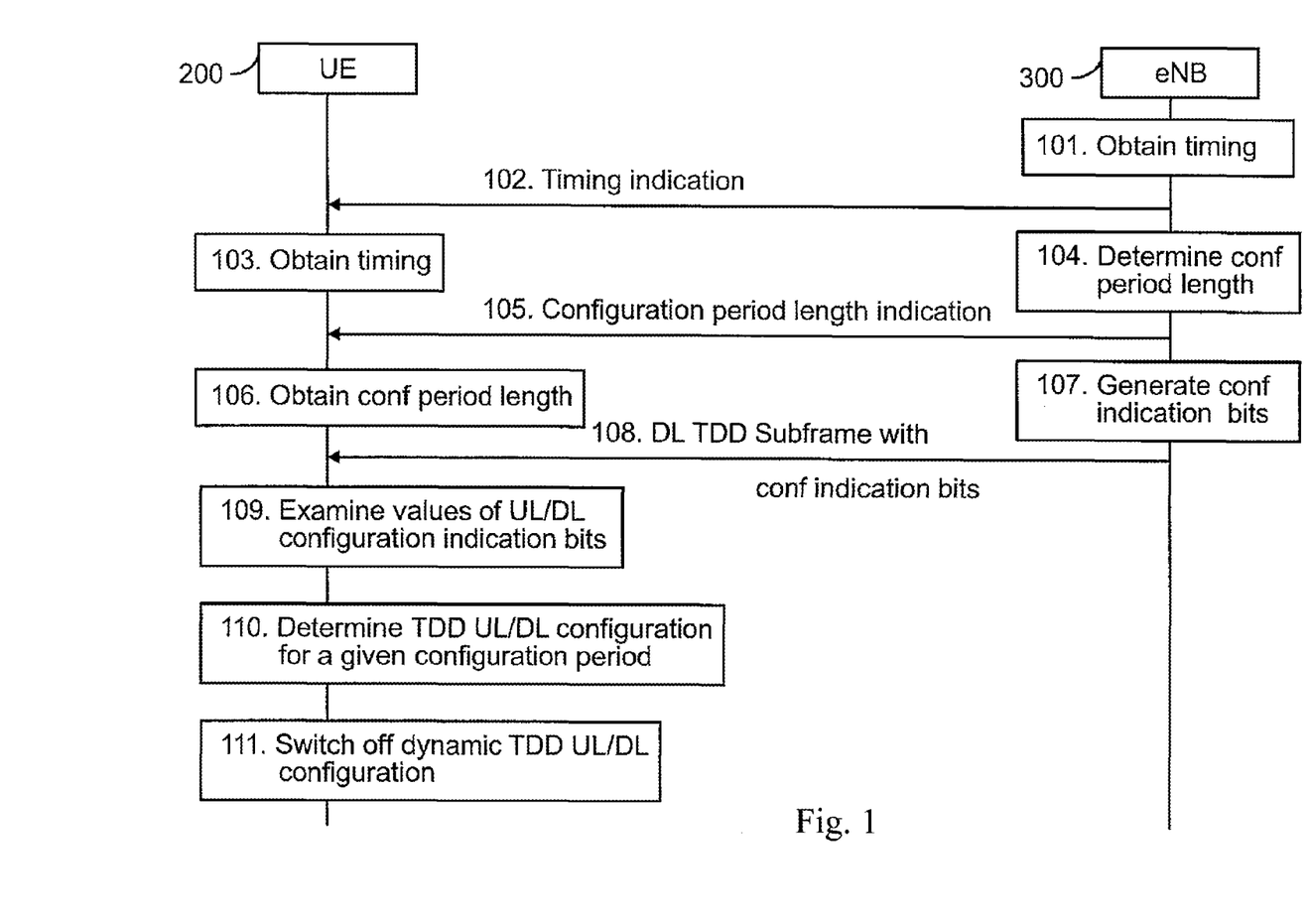
FIG. 1 is a flow diagram illustrating a method according to an embodiment of the invention.

FIG. 1 is a flow diagram illustrating a method of dynamic uplink/downlink configuration for time division duplex according to an embodiment of the invention.

At step 101, a radio network node 300 obtains timing for at least one time division duplex (TDD) uplink/downlink (UL/DL) configuration indication bit. The radio network node 300 may include e.g. a base station or an evolved Node B (eNB). The radio network node 300 may be deployed e.g. in a mobile communications network utilizing a version of LTE technology, such as LTE Advanced, for example. The radio network node 300 is described in more detail with reference to FIG. 3.

As discussed in more detail below, the TDD UL/DL configuration indication bit or bits are bits that the present invention uses to indicate which non-fixed subframes of a TDD radio frame (illustrated in FIG. 4) are allocated for downlink use and which are allocated for uplink use. The timing of these bits indicates their location in the subframe in which they are transmitted from the radio network node 300 to an apparatus 200. The radio network node 300 may obtain the timing e.g. by receiving it from the network.

At step 102, an indication of the obtained timing of the at least one time division duplex uplink/downlink configuration indication bit is transmitted from the radio network node 300 to the apparatus 200. At step 103, the apparatus 200 obtains the timing based on the received indication.

As discussed in more detail with reference to FIG. 2, the apparatus 200 may include e.g. a mobile device or a handset or a user equipment (UE) of a mobile communications network. Alternatively, the apparatus 200 may include e.g. a chipset deployed in a mobile device or a handset or a user equipment of a mobile communications network.

At step 104, the radio network node 300 determines length of a configuration period for a time division duplex uplink/downlink configuration. Herein, the term "configuration period" is used to refer to the time period for which a TDD UL/DL configuration indicated by the TDD UL/DL configuration indication bit(s) is valid. The length of the configuration period may be e.g. 10 ms. However, the radio network node 300 can adjust the configuration period as needed, e.g. according to traffic statistics.

At step 105, an indication of the determined length of the configuration period is transmitted from the radio network node 300 to the apparatus 200. At step 106, the apparatus 200 obtains the length of the configuration period based on the received indication.

At step 107, the radio network node 300 generates one or more TDD UL/DL configuration indication bits indicating a TDD UL/DL configuration for the configuration period of the determined length. At step 108, the generated TDD UL/DL configuration indication bits are transmitted from the radio network node 300 to the apparatus 200 in a region or location indicated by the obtained timing in a DL TDD subframe.

At step 109, the apparatus 200 examines the values of the at least one uplink/downlink configuration indication bit in the predetermined (i.e. indicated by the previously obtained timing) region in the received downlink time division duplex subframe.

At step 110, the apparatus 200 determines a TDD UL/DL configuration for the predetermined configuration period based on the values examined at step 109.

At optional step 111, the dynamic TDD UL/DL configuration of the present invention is switched off. As described above, the radio network node 300 can adjust the configuration period as needed. If it determines e.g. that there is no significant change in DL/UL traffic in the cell, it may cause switching off the dynamic TDD UL/DL configuration of the present invention by setting the length of the configuration period to a predetermined value which the apparatus 200 will interpret as a command to switch off the dynamic TDD UL/DL configuration of the present invention. As a result, the apparatus 200 will determine a next time division duplex uplink/downlink configuration based on received system information, as in prior art.

Figure 2:
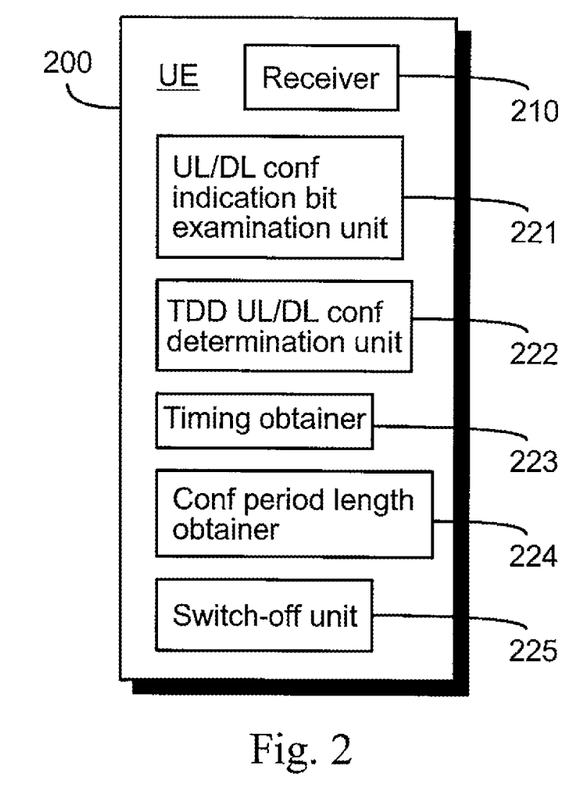
FIG. 2 is a block diagram illustrating an apparatus according to an embodiment of the invention.

FIG. 2 is a block diagram illustrating an apparatus 200 according to an embodiment of the invention. The apparatus 200 may include e.g. a mobile device or a handset or a user equipment (UE) of a mobile communications network. Alternatively, the apparatus 200 may include e.g. a chipset deployed in a mobile device or a handset or a user equipment of a mobile communications network. Furthermore, the apparatus 200 may include a receiver 210 that is configured to receive DL TDD subframes of wireless data transmission. The apparatus 200 further includes an UL/DL configuration indication bit examination unit 221 that is configured to examine the values of at least one UL/DL configuration indication bit in a predetermined region in a received DL TDD subframe of wireless data transmission. The apparatus 200 further includes a TDD UL/DL configuration determination unit 222 that is configured to determine a TDD UL/DL configuration for a predetermined configuration period based on the examined values.

The apparatus 200 may further include a timing obtainer 223 that is configured to obtain the timing of the at least one UL/DL configuration indication bit to be examined based on a received indication of the timing of the at least one UL/DL configuration indication bit. The apparatus 200 may further include a configuration period length obtainer 224 that is configured to obtain the length of the predetermined configuration period from a received indication of the length of the predetermined configuration period. The apparatus 200 may further include a switch-off unit 225 that is configured to determine a next TDD UL/DL configuration based on received system information, in response to a predetermined value of the received indication of the length of the predetermined configuration period. The above described elements 221-225 of the apparatus 200 may be implemented with software or hardware, or a combination of both.

Figure 3:
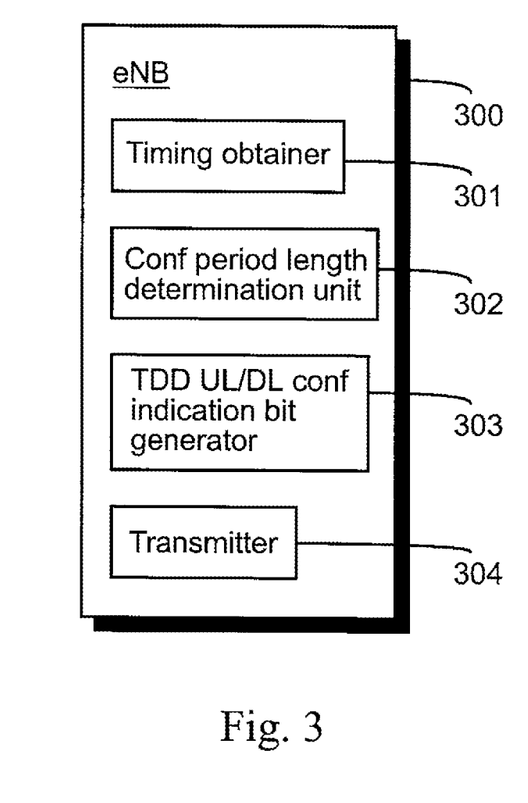
FIG. 3 is a block diagram illustrating a radio network node according to an embodiment of the invention.

FIG. 3 is a block diagram illustrating a radio network node 300 according to an embodiment of the invention. The radio network node 300 may include e.g. a base station or an evolved Node B (eNB). The radio network node 300 may be deployed e.g. in a mobile communications network utilizing a version of LTE technology, such as LTE Advanced, for example. Furthermore, the radio network node 300 includes a timing obtainer 301 that is configured to obtain timing for at least one time division duplex uplink/downlink configuration indication bit. The radio network node 300 further includes a configuration period length determination unit 302 that is configured to determine length of a configuration period for a time division duplex up-link/downlink configuration. The radio network node 300 further includes a time division duplex uplink/downlink configuration indication bit generator 303 that is configured to generate at least one time division duplex uplink/downlink configuration indication bit indicating a time division duplex uplink/downlink configuration for the configuration period of the determined length. The radio network node 300 further includes a transmitter 304 that is configured to transmit an indication of the obtained timing of the at least one time division duplex uplink/downlink configuration indication bit. The transmitter 304 is further configured to transmit an indication of the determined length of the configuration period. The transmitter 304 is further configured to transmit the generated at least one time division duplex uplink/downlink configuration indication bit in a region indicated by the obtained timing in a downlink time division duplex subframe of wireless data transmission. The above described elements 301-304 of the radio network node 300 may be implemented with software or hardware, or a combination of both.

As discussed above, the time division duplex uplink/downlink configuration determined according to the present invention includes one of an uplink allocation and a downlink allocation for at least one non-fixed subframe in the predetermined configuration period.

As an example, let us first assume that the configuration period is 10 ms. Let us also assume that a default. TDD UL/DL configuration used in the present cell is #0 in Table 1, i.e., DSUUU DSUUU. Herein, "default" configuration indicates that legacy mobile devices in the cell will assume based on received system information messages that the current TDD configuration is #0. In this example, four TDD UL/DL configuration indication bits are used to indicate which non-fixed subframes are allocated for downlink use and which are allocated for uplink use. More specifically, in this example the non-fixed subframes to be allocated are the last two non-fixed subframes in each 5 ins half-frame, i.e. the subframes 3, 4, 8 and in Table 1 (all of which are allocated for uplink use in prior art TDD configuration #0). The result is illustrated in Table 2 below:

TABLE 2

| TDD Configuration Indication Bits | UL/DL Configuration |
|---|---|
| 0000 | DSUUU DSUUU |
| 0001 | DSUUU DSUUD |
| 0010 | DSUUU DSUDD |
| 0011 | DSUUD DSUUU |
| 0100 | DSUUD DSUUD |
| 0101 | DSUUD DSUDD |
| 0110 | DSUDD DSUUU |
| 0111 | DSUDD DSUUD |
| 1000 | DSUDD DSUDD |

As can be seen by comparing tables 1 and 2, the embodiment of Table 2 provides a wider variety of UL/DL configurations to select from. Furthermore, in this example the UL/DL configuration can be changed significantly faster than in prior art, since the configuration period of the present embodiment is 10 ms, whereas prior art uses system information messages to change the UL/DL configuration and these system information messages are sent at the interval of at least 640 ms. Accordingly the present invention allows significantly faster and more dynamic configuration of UL/DL allocations.

If the UL/DL configurations are restricted to TDD UL-DL configurations in LTE Release 8, an example of TDD UL/DL configuration indication bits is illustrated in Table 3 below:

TABLE 3

| TDD Configuration Indication Bits | UL/DL Configuration |
|---|---|
| 00 | DSUUU DSUUU |
| 01 | DSUUD DSUUD |
| 10 | DSUDD DSUDD |
| 11 | DSUUU DSUUD |

In an embodiment, the interpretation of the TDD configuration indication bits may depend on the default TDD configuration indicated by the system information. For example, if the default TDD UL-DL configuration is #1 of Table 1, i.e. DSUUD DSUUD, the meaning of the TDD configuration indication bits may be defined accordingly as well.

Figure 5A:
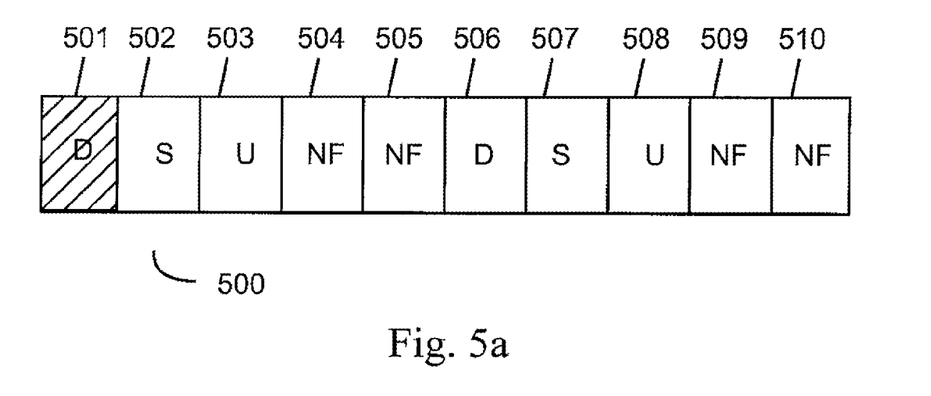
FIGS. 5a-5b illustrate examples of subframes used to carry uplink/downlink configuration indication bits according to embodiments of the invention.
Figure 5B:
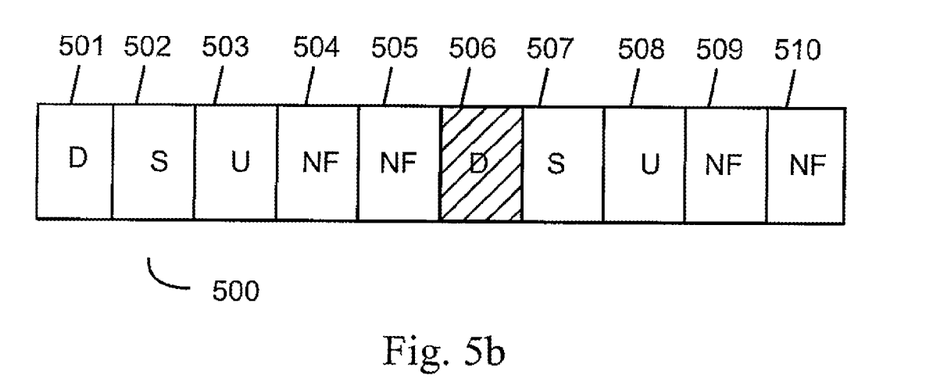

In an embodiment, the DL TDD subframe in which the TDD UL/DL configuration indication bits are transmitted may include e.g. a fixed subframe. One reason to send the TDD UL/DL configuration indication bits in a fixed subframe is to guarantee a satisfying performance, since typically there is less interference in fixed. DL subframes than in non fixed (NF) subframes. In an embodiment, the predetermined configuration period may include a current configuration period. This is illustrated in FIG. 5a wherein the TDD UL/DL configuration indication bits are transmitted in the fixed DL subframe 501 for the current configuration period which in the case of FIG. 5a is the duration of the radio frame 500 in a subframe of which the TDD UL/DL configuration indication bits are transmitted. In another embodiment, the predetermined configuration period may include a next configuration period. This is illustrated in FIG. 5b wherein the TDD UL/DL configuration indication bits are transmitted in the fixed DL subframe 506 for the next configuration period which in the case of FIG. 5b is the duration of an upcoming radio frame following the radio frame 500 in a subframe of which the TDD UL/DL configuration indication bits are transmitted. In practice, the exact timing of transmitting the UL/DL configuration indication bits may be signaled via a higher layer, so that this is clear for both radio network nodes and mobile devices. Either any fixed DL subframes or only some fixed DL subframes may be used to send the indication bits.

In an embodiment, the predetermined region may include a region in the received subframe that is associated with a physical control channel. As is known in the art, LTE techniques provide physical channels which are transmission channels carrying user data and control messages; transport channels which offer information transfer to Medium Access Control (MAC) and higher layers; and logical channels which provide services for the MAC layer within the LTE protocol structure.

More particularly, in an embodiment, the physical control channel associated region may include a region in the received subframe that is associated with a physical hybrid ARQ indicator channel (PHICH). As is known in the art, the PHICH is a channel used to report the Hybrid ARQ status. In this case, the at least one uplink/downlink configuration indication bit may be included in at least one predetermined resource of the PHICH. Furthermore, the indication of the timing of the at least one UL/DL configuration indication bit may include an indication of the timing of this at least one predetermined resource. In this embodiment, each UL/DL configuration indication bit may be processed as a PHICH bit, i.e. binary phase-shift keying (BPSK) modulated, repeated, and multiplied with an orthogonal sequence and scrambled. The orthogonal sequence would be known e.g. from the predetermined PHICH resource for the indication. The radio network node 300 may also configure more than one PHICH resource for each TDD configuration indication bit. In this case, the above process may be repeated using a different PHICH resource ($N_{PHICH}^{group}$, $n_{PHICH}^{seq}$). In this embodiment, the radio network node 300 may control the physical uplink shared channel (PUSCH) resource allocation or the demodulation reference signal (RS) cyclic shift in order to avoid collision between UL/DL configuration indication of the invention and the PHICH. Each indication bit can occupy one or multiple PHICH resources: this provides flexibility to balance the indication bits performance and control signaling overhead.

In another embodiment, the physical control channel associated region may include a region in the received subframe that is associated with a physical downlink control channel (PDCCH). As is known in the art, the PDCCH is a channel used to carry mainly scheduling information. In this case, the at least one uplink/downlink configuration indication bit may be included in a predetermined control channel element (CCE) of the PDCCH. Furthermore, the indication of the timing of the at least one UL/DL configuration indication bit may include an indication of an index of the predetermined CCE. In this embodiment, the predetermined CCE index may be signaled via a higher layer from the radio network node 300. Also, the same coding and modulation scheme as in physical control format indicator channel (PCFICH) may be used, which will result in 16 symbols and similar performance as PCFICH. Moreover, to make full use of the predetermined CCE, further repetition may be introduced. In other words, the UL/DL configuration indication bits may be considered to be new downlink control information (DCI): a cyclic redundancy check (CRC) is attached to the indication bits, then they are convolution coded and rate-matched. After quadrature phase-shift keying (QPSK) modulation, the symbols are mapped to the predetermined. CCE like normal DCIs. This can help to avoid receiving wrong UL/DL configuration indication bits at the mobile device side. It is worth noting that the radio network temporary identifier (RNTI) used for the CRC scrambling is configured by the radio network node 300, and it can reuse one mobile device specific RNTI, e.g. it can use one of the mobile device's C-RNTI. Since this new DCI only appears in the predetermined CCE, it will not cause problems in the PDCCH detection.

For both the PHICH related embodiment and the PDCCH related embodiment, the intention is to maximize the reuse of the existing physical channel structure in terms of e.g. channel encoding, modulation and mapping to actual physical resources.

An advantage of the invention is that since it enables the mobile device to have pre-knowledge of non-fixed subframe types of the current configuration period, then the mobile device could send hybrid automatic repeat request (HARQ) feedback earlier in order to decrease the HARQ delay. For example, in FIG. 5b, without the invention, the mobile device could only send the UL feedback in a fixed UL subframe #2 in a radio frame following the radio frame 500; but with the pre-knowledge of the non-fixed subframe type which is indicated e.g. in DL subframe #5 (i.e. subframe 506 of radio frame 500 in FIG. 5b), the mobile device could send the UL feedback at least 3 ms earlier in subframe #9 (i.e. subframe 510 of radio frame 500 in FIG. 5b) when this non-fixed subframe #9 is the DL subframe. This also applies when the mobile device receives DL feedback.

Another advantage of the invention is that since the mobile device will be able to know the dynamic TDD UL/DL configuration in the beginning of a configuration period, it may put fewer burdens on the mobile device in terms of PDCCH blind detection and channel estimation. The invention may simplify the mobile device's implementation of channel estimation filtering coefficient change due to TDD configuration change, and therefore may still enable accurate channel estimation.

The exemplary embodiments can include, for example, any suitable servers, workstations, PCs, laptop computers, personal digital assistants (PDAs), Internet appliances, handheld devices, cellular telephones, smart phones, wireless devices, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3 G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, RD DVD-R, HD DVD-RW, RD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

What is claimed is:

1. A method, comprising:
obtaining timing of one or more uplink/downlink configuration indication bits to be examined from a received indication of the timing of the one or more uplink/downlink configuration indication bits;
examining a value of the one or more uplink/downlink configuration indication bits in a predetermined region in a received downlink time division duplex subframe of wireless data transmission, the predetermined region indicated by the obtained timing; and
determining a time division duplex uplink/downlink configuration for a predetermined configuration period using the examined value of the one or more uplink/downlink configuration indication bits.

2. The method according to claim 1, further comprising:
receiving the downlink time division duplex subframe including the one or more uplink/downlink configuration indication bits,
wherein the received downlink time division duplex subframe comprises a fixed subframe.

3. The method according to claim 1, wherein the predetermined configuration period comprises one of a current configuration period and a next configuration period.

4. The method according to claim 1, wherein the determined time division duplex uplink/downlink configuration comprises one of an uplink allocation and a downlink allocation for at least one non-fixed subframe in the predetermined configuration period.

5. The method according to claim 1, wherein the predetermined region comprises a physical control channel associated region in the received subframe.

6. The method according to claim 5, wherein:
the physical control channel associated region comprises a physical hybrid ARQ indicator channel associated region,
the one or more uplink/downlink configuration indication bits are included in at least one predetermined resource of the physical hybrid ARQ indicator channel, and
the indication of the timing of the one or more uplink/downlink configuration indication bits comprises an indication of the timing of the at least one predetermined resource.

7. The method according to claim 5, wherein:
the physical control channel associated region comprises a physical downlink control channel associated region,
the one or more uplink/downlink configuration indication bits are included in a predetermined control channel element of the physical downlink control channel, and
the indication of the timing of the one or more uplink/downlink configuration indication bits comprises an indication of an index of the predetermined control channel element.

8. The method according to claim 1, further comprising:
obtaining a length of the predetermined configuration period from a received indication of the length of the predetermined configuration period,
wherein the predetermined configuration period indicates a time period during which the time division duplex uplink/downlink configuration indicated by the one or more uplink/downlink configuration indication bits is valid.

9. The method according to claim 8, further comprising:
in response to a predetermined value of the received indication of the length of the predetermined configuration period, determining a next time division duplex uplink/downlink configuration using received system information.

10. The method according to claim 1, wherein the timing of the one or more uplink/downlink configuration indication bits indicates a location of the one or more uplink/downlink configuration indication bits in the downlink time division duplex subframe.

11. The method according to claim 1, wherein the one or more uplink/downlink configuration indication bits indicate that each of non-fixed subframes in a time division duplex radio frame is allocated for uplink use or allocated for downlink use during the predetermined configuration period.

12. An apparatus, comprising:
one or more processors, one or more circuits, or any combination thereof configured to:
obtain timing of one or more uplink/downlink configuration indication bits to be examined from a received indication of the timing of the one or more uplink/downlink configuration indication bits;
examine a value of the one or more uplink/downlink configuration indication bits in a predetermined region in a received downlink time division duplex subframe of wireless data transmission, the predetermined region indicated by the obtained timing; and
determine a time division duplex uplink/downlink configuration for a predetermined configuration period using the examined value of the one or more uplink/downlink configuration indication bits.

13. The apparatus according to claim 12, further comprising the one or more processors, the one or more circuits, or any combination thereof configured to:
receive the downlink time division duplex subframe including the one or more uplink/downlink configuration indication bits,
wherein the received downlink time division duplex subframe comprises a fixed subframe.

14. The apparatus according to claim 12, wherein the predetermined configuration period comprises one of a current configuration period and a next configuration period.

15. The apparatus according to claim 12, wherein the determined time division duplex uplink/downlink configuration comprises one of an uplink allocation and a downlink allocation for at least one non-fixed subframe in the predetermined configuration period.

16. The apparatus according to claim 12, wherein the predetermined region comprises a physical control channel associated region in the received subframe.

17. The apparatus according to claim 16, wherein:
the physical control channel associated region comprises a physical hybrid ARQ indicator channel associated region,
the one or more uplink/downlink configuration indication bits are included in at least one predetermined resource of the physical hybrid ARQ indicator channel, and
the indication of the timing of the one or more uplink/downlink configuration indication bits comprises an indication of the timing of the at least one predetermined resource.

18. The apparatus according to claim 16, wherein:
the physical control channel associated region comprises a physical downlink control channel associated region,
the one or more uplink/downlink configuration indication bits are included in a predetermined control channel element of the physical downlink control channel, and
the indication of the timing of the one or more uplink/downlink configuration indication bits comprises an indication of an index of the predetermined control channel element.

19. The apparatus according to claim 12, further comprising the one or more processors, the one or more circuits, or any combination thereof configured to:
obtain a length of the predetermined configuration period from a received indication of the length of the predetermined configuration period,
wherein the predetermined configuration period indicates a time period during which the time division duplex uplink/downlink configuration indicated by the one or more uplink/downlink configuration indication bits is valid.

20. The apparatus according to claim 19, further comprising the one or more processors, the one or more circuits, or any combination thereof configured to:
determine a next time division duplex uplink/downlink configuration using received system information, in response to a predetermined value of the received indication of the length of the predetermined configuration period.

21. A non-transitory computer-readable storage medium storing instructions that when executed by a data processing system, cause the data-processing system to:
obtain timing of one or more uplink/downlink configuration indication bits to be examined from a received indication of the timing of the one or more uplink/downlink configuration indication bits;
examine a value of the one or more uplink/downlink configuration indication bits in a predetermined region in a received downlink time division duplex subframe of wireless data transmission, the predetermined region indicated by the obtained timing; and determine a time division duplex uplink/downlink configuration for a predetermined configuration period using the examined value of the one or more uplink/downlink configuration indication bits.

22. A radio network node, comprising:

one or more processors, one or more circuits, or any combination thereof configured to:
  obtain timing for one or more time division duplex uplink/downlink configuration indication bits;
  determine a length of a configuration period for a time division duplex uplink/downlink configuration; and
  generate the one or more time division duplex uplink/downlink configuration indication bits indicating a time division duplex uplink/downlink configuration for the configuration period with the determined length; and
a transmitter configured to:
  transmit an indication of the obtained timing of the one or more time division duplex uplink/downlink configuration indication bits;
  transmit an indication of the determined length of the configuration period; and
  transmit the generated one or more time division duplex uplink/downlink configuration indication bits in a region indicated by the obtained timing in a downlink time division duplex subframe of wireless data transmission.

23. A method, comprising:

examining a value of one or more uplink/downlink configuration indication bits in a predetermined region in a received downlink time division duplex subframe of wireless data transmission; and determining a time division duplex uplink/downlink configuration for a predetermined configuration period using the examined value of the one or more uplink/downlink configuration indication bits, wherein:

the predetermined region comprises a physical control channel associated region in the received downlink time division duplex subframe; and the physical control channel associated region comprises one of a physical hybrid ARQ indicator channel associated region or a physical downlink control channel associated region, and wherein:

in response to the physical control channel associated region comprising a physical hybrid ARQ indicator channel associated region, the one or more uplink/downlink configuration indication bits are included in at least one predetermined resource of the physical hybrid ARQ indicator channel; or in response to the physical control channel associated region comprising a physical downlink control channel associated region, the one or more uplink/downlink configuration indication bits are included in a predetermined control channel element of the physical downlink control channel.

* * * * *